United States Patent
Paragios et al.

(10) Patent No.: US 8,890,862 B2
(45) Date of Patent: Nov. 18, 2014

(54) METHOD AND DEVICE FOR EFFICIENT PARALLEL MESSAGE COMPUTATION FOR MAP INFERENCE

(75) Inventors: Nikos Paragios, Vincennes (FR); Aristeidis Sotiras, Montrouge (FR); Stavros Alchatzidis, Massy (FR)

(73) Assignee: Ecole Centrale Paris, Chatenay Malabry (FR)

( * ) Notice: Subject to any disclaimer, the term of this patent is extended or adjusted under 35 U.S.C. 154(b) by 0 days.

(21) Appl. No.: 14/005,339

(22) PCT Filed: Mar. 14, 2012

(86) PCT No.: PCT/EP2012/054485
§ 371 (c)(1),
(2), (4) Date: Sep. 16, 2013

(87) PCT Pub. No.: WO2012/123505
PCT Pub. Date: Sep. 20, 2012

(65) Prior Publication Data
US 2014/0002466 A1    Jan. 2, 2014

Related U.S. Application Data (60) Provisional application No. 61/452,199, filed on Mar. 14, 2011.

(51) Int. Cl.
| | |
|---|---|
| G06F 17/00 | (2006.01) |
| G06K 9/00 | (2006.01) |
| G06T 1/20 | (2006.01) |
| G06T 7/00 | (2006.01) |
| G06K 9/62 | (2006.01) |

(52) U.S. Cl.
CPC ............ *G06T 1/20* (2013.01); *G06K 9/00973* (2013.01); *G06T 7/0081* (2013.01); *G06T 7/0093* (2013.01); *G06T 7/0087* (2013.01); *G06K 9/6297* (2013.01); *G06T 2207/20156* (2013.01)
USPC ........................................................ 345/418

(58) Field of Classification Search
None
See application file for complete search history.

(56) References Cited

U.S. PATENT DOCUMENTS

| | | | |
|---|---|---|---|
| 5,774,581 A | 6/1998 | Fassnacht et al. | |
| 8,291,292 B1 * | 10/2012 | Varnica et al. | ........... 714/758 |

(Continued)

OTHER PUBLICATIONS

Ash et al., "Generalized Dirichlet Tessellations", Geometriae Dedicata, 1986, vol. 20, pp. 209-243.

(Continued)

*Primary Examiner* — Xiao Wu
*Assistant Examiner* — Xilin Guo
(74) *Attorney, Agent, or Firm* — Young & Thompson (57) ABSTRACT

A message passing scheme for MAP inference on Markov Random Fields based on a message computation using an intermediate input vector I, an output message vector M, an auxiliary seed vector S, all of equal length N, and a pairwise function r=d(x,y), where r, x, y are real numbers, includes:

for each element j of vector S, do S(j)=j
consider an index distance Δ=2^floor(log 2(N)); repeat while Δ>0
for each index of vector I, namely i, do in parallel:
  consider the set of all indices within distance Δ from a given i, augmented by i;
  for every k belonging to this set, calculate its distance from i using the function: d(i,k)+I(S(k)); find the minimum distance and call n the index corresponding to this minimum distance
    do $S(i)=S(n)$
    Δ=floor (Δ/2)
for each j of vector M, do M(j)=I(S(j))+d(j,S(j)).

12 Claims, 6 Drawing Sheets

(56) References Cited

U.S. PATENT DOCUMENTS

| | | | |
|---|---|---|---|
| 2006/0156167 A1* | 7/2006 | Dielissen et al. | 714/752 |
| 2006/0285762 A1* | 12/2006 | Sun et al. | 382/254 |
| 2008/0195898 A1* | 8/2008 | Savin | 714/699 |
| 2009/0046951 A1 | 2/2009 | Paragios et al. | |
| 2009/0252416 A1 | 10/2009 | Komodakis et al. | |
| 2010/0042896 A1* | 2/2010 | Gunnam | 714/752 |

OTHER PUBLICATIONS

Felzenszwalb et al., "Efficient Belief Propagation for Early Vision", IJCV, 2006, pp. 1-8.

Kolmogorov et al., "Convergent Tree-Reweighted Message Passing for Energy Minimization", Ions on Pattern Analysis and Machine Intelligence, 2006, vol. 28, No. 10, pp. 1568-1583, XP001523454.

Rong et al., "Jump Flooding in GPU with Applications to Voronoi Diagram and Distance Transform", In Proceedings of the 2006 Symposium on Interactive 3D graphics and Games, 2006, pp. 109-116, XP002682192.

Walters et al., "Evaluating the use of GPUs in Liver Image Segmentation and HMMER Database Searches", Parallel & Distributed Processing, 2009, IEEE International Symposium on, pp. 1-12, XP031487518.

Wolf et al., "Inference and parameter estimation on hierarchical belief networks for image segmentation", Neurocomputing, 2010, vol. 73, pp. 563-569, XP026888249.

Xu et al., "Belief Propagation Implementation Using CUDA on an NVIDIA GTX 280", LNAI 5866, 2009, pp. 180-189, XP19134728.

International Search Report, dated Aug. 23, 2012, from corresponding PCT application.

* cited by examiner

METHOD AND DEVICE FOR EFFICIENT PARALLEL MESSAGE COMPUTATION FOR MAP INFERENCE

This application claims priority from "Efficient Parallel Message Computation for MAP Inference", U.S. Provisional Application No. 61/452,199 of Alchatzidis, et al., filed Mar. 14, 2011, the contents of which are herein incorporated by reference in their entirety.

The present invention relates to a method for minimizing energy in digitized images using Markov Random Fields.

Markov Random Fields were initially introduced in computer vision to address image restoration and have been considered to address more complex problems like segmentation, motion estimation, stereo-reconstruction, etc. Key part for the success of such models has played the advance made on the conception of efficient optimization algorithms. Initially, the main shortcoming of the inference algorithms was either their slow convergence or the lack of optimality guarantees on the obtained solutions.

These shortcomings were alleviated by the introduction of techniques like graph-cuts, belief propagation and more recently linear programming methods that boosted the interest towards MRF models.

Inference on such models can be performed either by graph-based methods or message passing ones. The first ones are based on the max-flow min-cut principle and are characterized by their computational efficiency especially when applied to regular graphs. Methods that belong to this class are graph-cut methods including their multi-label expansion and dynamic graph-cuts. Their main drawback is that they are limited by the type of energy to be minimized. The second class of methods is based on the propagation of beliefs in the graph by local exchange of messages.

Max-Product Loopy Belief Propagation, their efficient variants, tree-reweighted message passing and more recently dual decomposition are representative methods in this direction. These methods are able to cope with arbitrary energies. Moreover, they tend to provide higher quality solutions and better optimality bounds while at the same time being able to handle high order interactions.

Despite the success of the message passing algorithms, they rest relatively computational demanding. A fact that compromises their use in large graphs with large label-sets.

To counter this shortcoming, two efficient message computation schemes based on distance transforms were proposed in the publication: P. Felzenszwalb and D. Huttenlocher; "Efficient belief propagation for early vision." IJCV, 70:41-54, 2006. The proposed distance transforms are performed in a sequential way.

Belief propagation has also been investigated in Graphical Processing Units (GPU) in an effort to take advantage of the computational power of the parallel architecture to accelerate the inference. Said investigation has been disclosed in the document: Y. Xu, H. Chen, R. Klette, J. Liu, and T. Vaudrey. "Belief propagation implementation using cuda on an nvidia gtx 280. In A. Nicholson and X. Li, editors, AI 2009: Advances in Artificial Intelligence, volume 5866 of Lecture Notes in Computer Science, pages 180-189. Springer Berlin/Heidelberg, 2009.

BELIEF PROPAGATION METHODS

The discrete MRF problem is an attempt to assign to each node of a graph $G=(v,\epsilon)$, a label $l_p$ (where $p \in v$) coming from a label-set L. $v$ and $\epsilon$ denote the set of the vertices and the edges of the graph respectively. The set of vertices models the variables to be estimated, while the one of the edges the interactions between them. The labels correspond to the possible values that the latent variables can take. The labeling problem can be cast as the following minimization one:

$$\min \sum_{p \in v} d_p(l_p) + \sum_{p,q \in \varepsilon} d_{pq}(l_p, l_q)$$

where $d_p$ represents the unary potentials and $d_{pq}$ the pairwise ones.

Belief propagation methods attempt to optimize this problem by exchanging messages between nodes. Each message is a vector with size equal to $K=|L|_{(by)}|\cdot|$, the cardinality of the set is denoted). The message, defined as $m_{p \to q}^t$, is transmitted from node p to node q at iteration t. At each iteration messages are computed as follows:

$$m_{p \to q}^t(l_q) = \min_{l_p}(d_{pq}(l_p, l_q) + d_p(l_p) + \sum_{n \in N(p) \backslash q} m_{n \to p}^{t-1}(l_q))$$

where N(p) is the set of nodes with which node q is connected with an edge (also called neighborhood nodes). Hereafter, the message that results from the previous operation will be also denoted as $m_{res}$. Note that in the previous equation as well as in the rest, negative log probabilities are considered turning the initial max-product problem into its equivalent min-sum one. A normalization step is usually applied afterwards contributing to the robustness of the algorithm:

$$m_{res}(l_p) = m_{res}(l_p) - \min_q m_{res}(l_q)$$

At each iteration, a belief vector b can be computed for every node, $$b_q(l_q) = d_p(l_q) + \sum_{n \in N(p)} m_{n \to p}^t(l_q))$$

The labeling that corresponds to Maximum A-Posteriori Probability estimation for a node p is thus given by the labels that minimize the belief, or:

$$\min_p b_p(l_p)$$

In the document "Efficient belief propagation for early vision." Felzenszwalb and D. Huttenlocher; IJCV, 70:41-54, 2006, three ways have been proposed to speed up the Loopy-BP algorithm:

i) a multiscale approach, combining unary costs to derive a higher level graph and using the resulting messages as initialization of the lower level graph;

ii) a checkerboard message computation scheme, computing in parallel white and black tiles (using a checkerboard metaphor for a graph in grid connectivity), thus increasing propagation speed and halving memory requirements;

iii) a distance transform approach to message computation, resulting in algorithms with lower computation complexities for special classes of pairwise potentials.

The last contribution has proven to be the most popular, being incorporated in the implementations of many algorithms based on message computation thus allowing them to achieve great speed improvements. The main shortcomings of this method are the non-generalization to other pairwise potentials and the sequential nature of the message computation algorithms making problematic the design of an implementation that takes advantage of the emerging multiprocessor computer architectures.

Document US 2009/0252416 discloses graph-cut based methods and systems for MRF optimization for handling a wide class of MRFs encountered in image processing. The disclosed algorithm is implemented for minimizing static and dynamic MRFs by recovering pairs of solutions for a primal and a dual such that the gap between them is minimized.

SUMMARY OF THE INVENTION

An object of the present invention is to speed inference based on message passing strategies. Another objective of the invention is the generalization of efficient message passing schemes to pairwise potentials other than the $l_1$-norm and the quadratic.

The present invention is a computer-implemented method for efficiently performing a message passing algorithm, the method comprising: using a computer to perform the following:

for each node i in a message passing algorithm, iteratively:
for each node j linked to node i:
  combine incoming messages to form an intermediate vector I
  determining an output message vector M by:
    considering an auxiliary seed vector S; a pairwise function $r=d(x,y)$, where r, x, y are real numbers; and an index distance $\Delta \geq 2^{\wedge}floor(\log 2(N))$, N being the length of message vector M and the seed vector S
    initializing S as $S(m)=m$ for each element m of vector S,
    for each index p of the vector I and while $\Delta>0$, computing in parallel, by:
      considering the set of all indices within distance $\Delta$ from given index p, augmented by index p, for every index k belonging to this set, computing its distance from p using the function: $d(p,k)+I(S(k))$ in order to determine the minimum distance,
      computing $S(p)=S(n)$, n being the index corresponding to this minimum distance, and
      computing $\Delta=floor(\Delta/2)$, this being the last statement of the "for" loop,
    determining the message vector M by computing $M(m)=I(S(m))+d(m,S(m))$ for each element m of vector M,
    communicating the vector M to node i.

Concerning the vector M, it is clear that by vector, it is considered a structure indexed in a general number of dimensions.

The method according to the present invention is an algorithm favoring parallel implementation which enables to fully take advantage of the computational power of parallel processing architectures. The results obtained are as accurate as those of the state of the art inference methods, but generally one order of magnitude faster in terms of speed.

The method is based on a message passing algorithm with a specific formulation of the message computation as a distance transformation. It also takes advantage of the computational power of the parallel architectures to accelerate inference. The algorithm permits to estimate the message costs based notably on the jump flooding concept as disclosed in:

G. Rong and T.-S. Tan."Jump flooding in gpu with applications to voronoi diagram and distance transform". In Proceedings of the 2006 Symposium on Interactive 3D graphics and Games, I3D '06, pages 109-116, New York, N.Y., USA, 2006. ACM This algorithm was initially introduced to estimate Euclidean distance transforms in 2D images. In the scope of our invention the jump flooding concept is used on labelsets of general dimensions and for general distance functions. The method according to the invention has $O(n \log(n))$ complexity, with n being the size of the number of possible values for a given node, and thus is capable of handling large label sets.

With the index distance A an area of influence AOI may be defined. This AOI is a set that consists of all the indices, also named labels, that are closer to label i than any other label, including i itself; label i being called seed. The present invention permits for the case of a 1D labelset to find the exact solution for a pairwise distance that produces connected AOIs which contain the seed label. Every label belonging to such an AOI is labeled correctly.

The Jump Flooding algorithm enables to estimate the required AOIs efficiently. It is parallel and completely symmetrical as every label is treated as a possible seed and thus can account for the unknown number of seeds.

According to an embodiment of the invention, during the step of combining incoming messages, all incoming messages are combined except the one coming from j.

Preferably, after the step of determining an output message vector M, a normalization of messages is made.

The present invention also concerns a device comprising a non-transitory computer-readable storage medium encoded with computer-executable instructions which, when executed, efficiently perform a message passing algorithm according to the invention.

By reinterpreting in a more sound theoretical framework the problem of message computation as a distance transformation, the device according to the invention addresses both prior art shortcomings of non-generalization to any pairwise potentials and the sequential nature of the message computation by introducing a new parallel message computation algorithm.

According to a preferred embodiment of the invention, the method is implemented in a CUDA (Compute Unified Device Architecture) used to exploit a set of SIMD (Single Instruction Multiple Data) coprocessors. The term "architecture" relates to an abstraction on hardware. So CUDA is a notion of underlying structure used to exploit the hardware. Although not limited to this, CUDA is advantageously used to exploit a multi-core hardware architecture (GPU). The device according to the present invention exploits the computational power of the modern GPUs in order to achieve for example near real-time registration. The proposed framework has been implemented in GPU leading to decrease running times while being able to capture good minima.

In the programming model proposed by the above architecture', instructions may be programmed in the thread level; threads being executed concurrently in blocks within which they share memory in order to communicate; the sum of all blocks executes a common set of instructions called kernel.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities.

DETAILED DESCRIPTION OF THE PREFERRED EMBODIMENTS

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention as defined by the appended claims.

A great variety of inference algorithms is available in the literature for first-order MRF problems. In the document US 2009046951, an efficient graph-based method called Fast-PD was preferred because of its ability to produce good quality results very efficiently. Despite this fact, when passing the data calculation in a parallel architecture, the inference becomes the main bottleneck of the registration process even when Fast-PD (which is one of the fastest inference algorithms) is used.

Message passing algorithms are known for their ability to perform well for a variety of problems while not being constrained by the type of the energy. Though, they are often slow. To circumvent this, the implementation of the present invention uses a belief propagation algorithm to accelerate its performance while a novel parallel message computation algorithm is introduced that fully exploits parallel architectures. The belief propagation algorithm used is notably described in Felzenszwalb, P., Huttenlocher, D.: "Efficient belief propagation for early vision." IJCV 70, 41-54 (2006).

As already discussed, Felzenszwalb et al discloses first an efficient way to propagate the messages based on a checkerboard pattern, resulting in halving computation cost and memory demands while accelerating convergence. Moreover, a multi-scale approach is employed to facilitate the flow of information over large distances and decrease the number of iterations needed.

The inference problem is first solved for coarser graphs and then the solution (the messages) is used as initialization for solving the next level.

The computationally most demanding part of message passing algorithms is the message computation step ($O(n^2)$ complexity, where n stand for the number of labels). In Felzenszwalb et al., an efficient way to calculate them by exploiting its interpretation as a distance transform, was proposed. That technique is restrained by the type of the pairwise relation and is strictly sequential, inhibiting efficient implementations on parallel architectures.

The basic concept of message passing comprises transmitting a message from node p to node q at iteration t, said message being defined as:

$$m^t_{p \to q}(l_q) = \min_{l_p}(d_{pq}(l_p, l_q) + d_p(l_q) + \sum_{n \in N(p) \setminus q} m^{t-1}_{n \to p}(l_q))$$

an intermediate vector I is defined as:

$$I(k) = d_p(l_q) + \sum_{n \in N(p) \setminus q} m^{t-1}_{n \to p}(l_q))$$

where $N(p)$ is the set of the neighboring to p nodes and the size of the to message is equal to the number of the labels. To ease the notation, message will be denoted by $m_{res}$ hereafter. Based on messages, beliefs over the plausible solutions are calculated and the optimal labeling of a node corresponds to the label that minimizes the node's belief vector (Maximum A-Posteriori solution corresponds to a min-sum one when working on negative log probabilities).

Figure 1:
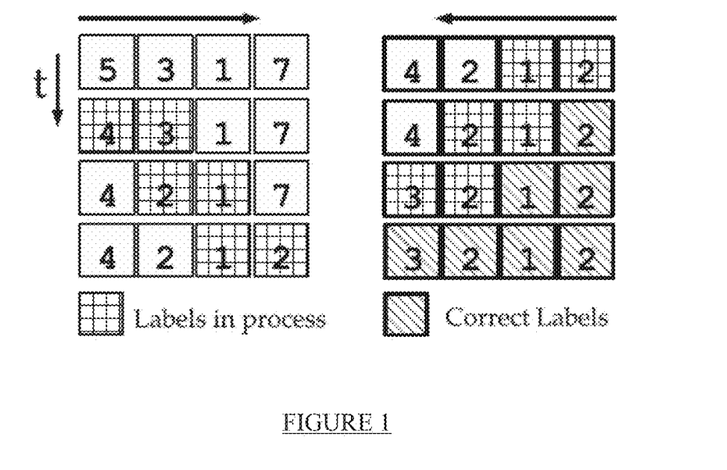
FIG. 1 is a schematic view illustrating a forward pass and a backward pass in a belief propagation algorithm for $L_1$ norm pairwise costs.

In Felzenszwalb et al., two algorithms are proposed to compute messages efficiently for two types of pairwise potentials: the $L_1$ norm, $d_{pq}(l_p, l_q) = |l_p - l_q|$ and the quadratic distance $d_{pq}(l_p, l_q) = (l_p - l_q)^2$. For linear pairwise costs, the algorithm scans twice I updating its values sequentially and requires no further buffer. FIG. 1 shows a block of four labels on which an efficient message computation is applied for $L_1$ norm pairwise costs. At each iteration t, the message is constituted by a set of four labels. The left block shows a forward pass. The right block shows a backward pass. The labels are embedded in a graph and the discontinuity cost is a linear function of distance in the graph.

For the quadratic ones, the algorithm computes the lower envelope of parabolas, $(x - l_p)^2$ requiring three extra buffers to hold information about intersections, and positions of the active parabolas. Both algorithms exhibit an $O(n)$ complexity and are not susceptible to any obvious parallelization scheme.

To overcome issues of current methods we regard message computation as an additively weighted distance transformation with an unknown number of seeds and we will use the distance transformation terminology to further analyze it. In the specific context, distance is defined by:

$$d_{AWDT}(k,l) = I(k) + d_{pq}(k,l),$$

where I stands for the intermediate vector and $d_{pq}$ for the pairwise potential function.

An area of influence (AOI) of a label i is a set that consists of all the labels that are closer (in terms of the previous distance) to label i than any other label. Label i is called seed.

$$AOI_i = \{l : \arg\min_k d_{AWDT}(k, l) = i\}$$

The value of the message $m_{res}$ for a label I depends on the seed to whose AOI the label belongs, or:

$$m_{res}(l) = I(i) + d_{pq}(i,l) l \in AOI,$$

Let $L=(1, \ldots, n)$ be the set of all labels. For the set of all the AOIs the following should stand:

$$\cup AOI_i = L \text{ and } AOI_i \cap AOI_j = \emptyset,$$

or a label can belong to only one AOI.

Thus, message computation (MC) can be seen as the process which, given an intermediate vector I and a label-set L, results in a set of seeds Σ (because initially any label can be a seed) and their respective AOIs:

$$I \xrightarrow{MC} \{AOI_i, i\}, i \in \sum$$

Lemma 1: If d is a metric than $i \in AOI_i$.

Proof: If i does not belong to its own AOI it will belong to another one's. Let this label be l, then $$I(l)+d(i,l)<I(i),$$

as d(i; i)=0, given d is a metric. If i is a seed then there exists some label k that belongs to its AOI. So it should stand that:

$$I(l)+d(i,k)<I(l)+d(l,k)$$

By replacing the former equation to the latter, we get:

$$d(i,l)+d(i,k)<d(l,k),$$

which contradicts with the definition of a metric. Thus, we can deduce that $i \in AOI_i$ since no such label l can exist.

Figure 2:
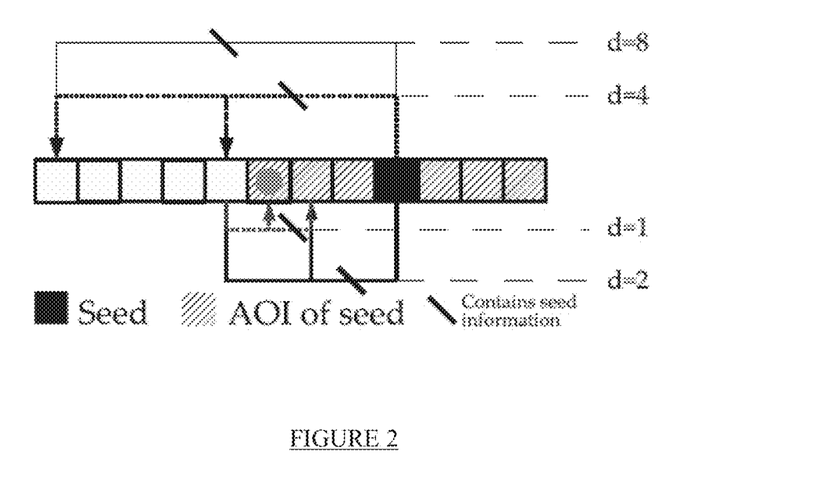
FIG. 2 is a schematic view illustrating the information propagation in a connected AOI containing its seed, according to the invention.

FIG. 2 depicts visualisation of seed information propagation in a connected AOI containing its seed. The dotted label will get the seed's information from a propagation path within the AOI.

The document P. F. Ash and E. D. Bolker, "Generalized dirichlet tessellations." Geometriae Dedicata, 20:209-243, 1986, gives much insight on the geometry of AOIs relating to the weighted distance function that produces them for the 2D case. More specifically they prove that a 2D additively weighted euclidean transformation produces AOIs separated by hyperbolas, a corresponding quadratic produces convex polygonal AOIs and a corresponding logarithmic produces circular AOIs. The formulations and the intuition developed in this document can be extended to the 3D case or specialized to the 1D case to extract approximation properties of the algorithm for a given pairwise function. Pairwise function apart, according to the invention, the connectivity of the AOI and the inclusion of its seed within it are necessary conditions (and in the 1D case sufficient also) for the algorithm to produce accurate results and any functions not respecting this will produce approximate results.

Figure 3:
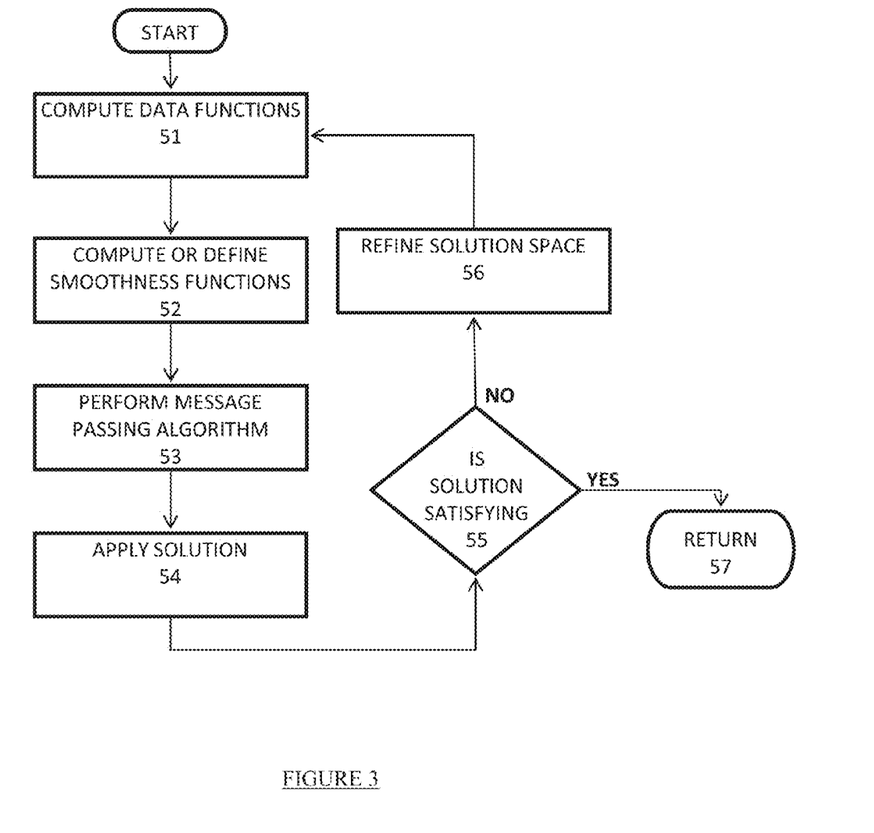
FIG. 3 is a flow chart of an iterative belief propagation process comprising a message passing algorithm in accordance with an embodiment of the present invention.

FIG. 3 presents a flow chart of an iterative message passing algorithm in accordance with an embodiment of the present invention. This iterative message passing algorithm generally operates as follows. Before the message passing algorithm starts, the system performs a number of initialization operations. These initialization operations include: computing data functions for nodes (step 51) and computing or defining smoothness functions between nodes (step 52).

The system then performs the message passing iterations, during which messages are passed between nodes in a graph (step 53). Next, after the message passing iterations have converged, the solution is applied (step 54). That means a mapping is defined from the solution space to the space where the initial problem was defined. For example: from labels representing displacements to pixel intensity values. At step 55, if the solution is satisfactory (depending on the algorithm used and the precision required), the system outputs a result (step 57). If the solution is not satisfactory at step 55, the solution space is refined in step 56, and a new process starts by computing data functions (step 51).

Figure 4:
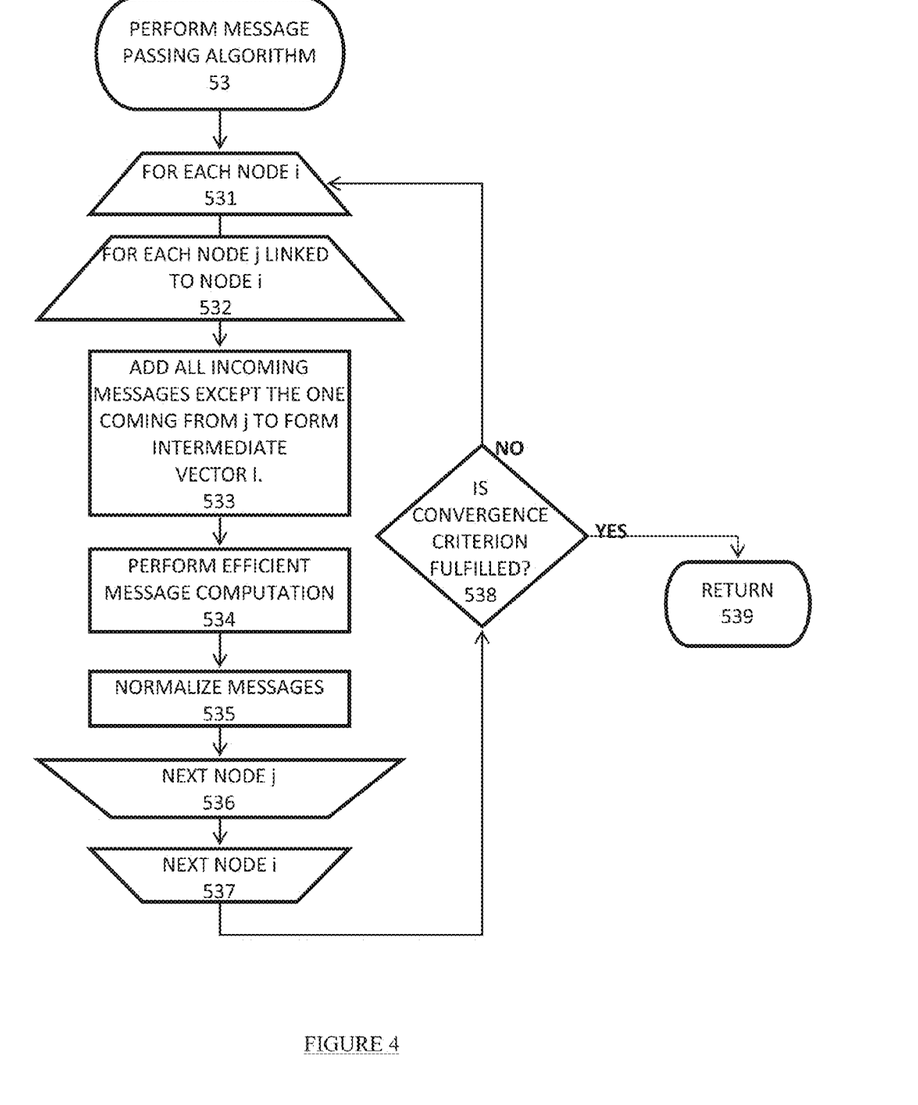
FIG. 4 is a flow chart illustrating the operations involved in performing the message passing algorithm in accordance with an embodiment of the present invention.

FIG. 4 presents a flow chart illustrating the operations involved in performing the message passing iterations in accordance with an embodiment of the present invention. This flow chart illustrates in more detail the operations which take place during step 53 of the flow chart in FIG. 3. For each node i in the graph (step 531), the system iteratively performs the following operations. For each node j in the graph (step 532), the system adds all incoming messages except the one coming from j to form intermediate vector I (step 533).

Next, the system performs an efficient message computation (step 534). A normalization is made for the robustness of the process (step 535). Step 536 concerns the transition to another node j. Step 537 concerns the transition to another node i.

At step 538, if a predetermined convergence criterion is fulfilled, that means the message passing iterations have converged, the system outputs a result (step 539). If not, a new process starts at step 531.

Figure 5:
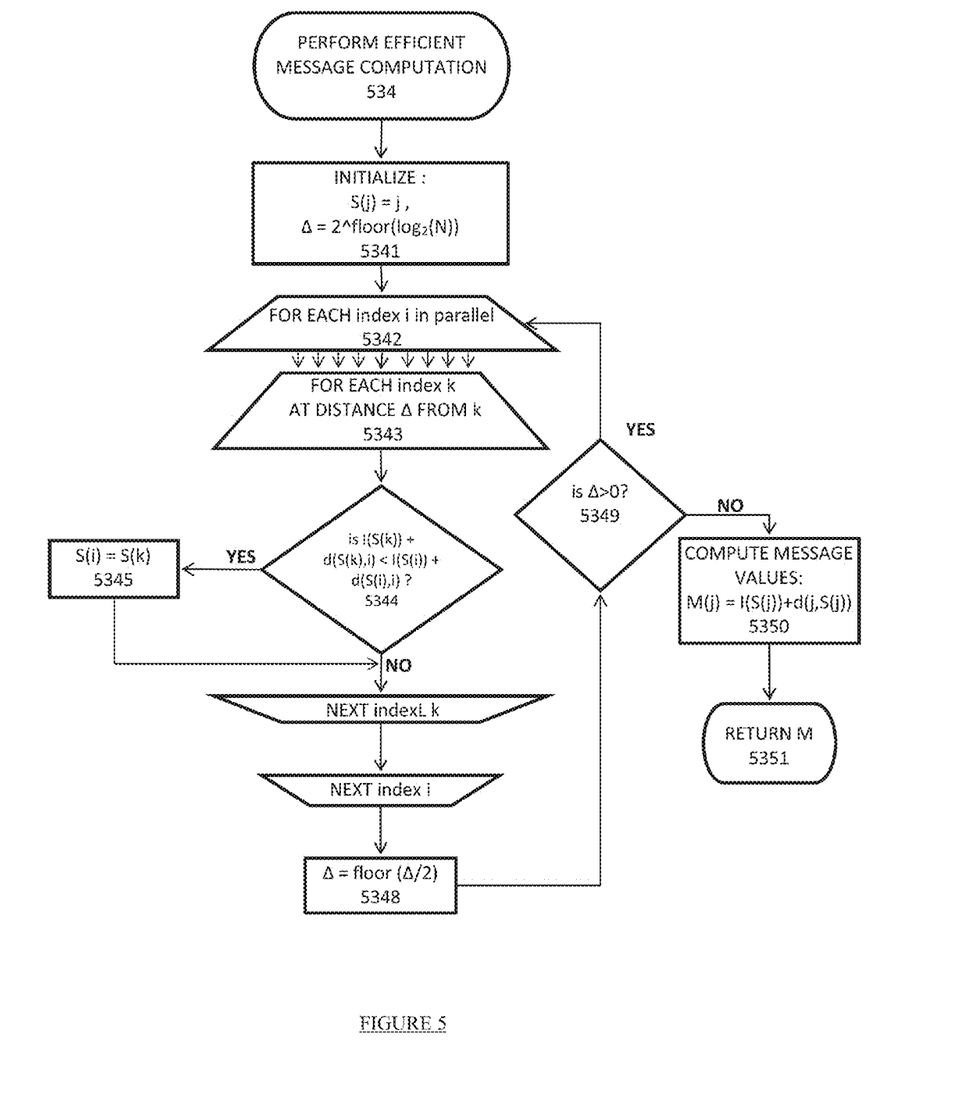
FIG. 5 is a flow chart illustrating the operations involved in performing the efficient message computation in accordance with an embodiment of the present invention.

FIG. 5 presents a flow chart illustrating the operations involved in performing the efficient message computation in accordance with an embodiment of the present invention. This flow chart illustrates in more detail the operations which take place during step 534 of the flow chart in FIG. 4. This iterative efficient message computation comprises a parallel process and operates as follows.

```
//Given    an intermediate input vector I,
//         an output message vector M,
//         an auxiliary seed vector S all of equal length N, and
//         a pairwise function r = d(x,y), where r,x,y are real numbers.
```

Initialisation (step 5341) : For each element j of vector S, do S(j)=j. Consider an index distance $\Delta = 2^{\text{floor}(\log 2(N))}$.
Repeat while Δ>0. (step 5349)
For each index of vector I, namely i, do in parallel:
consider the set of all indices within distance Δ from a given index i (step 5342), augmented by index i. For every index k (step 5343) belonging to this set, calculate its distance from i using the function: d(i,k)+I(S(k)). Find the minimum distance and call n the index corresponding to this minimum distance. (step 5344)
Do S(i)=S(n). (step 5345)
Δ=floor (Δ/2). (step 5348)
For each element j of vector M, do M(j)=I(S(j))+d(j,S(j)). (step 5350)
The system outputs a result, the vector M (step 5351).

Experimental Results

A CUDA implementation of the method according to the present invention has been created and tested against the most common pairwise optimization algorithms in the context of the Middlebury MRF benchmark. Two GPU versions of BP-P have been implemented using the sequential algorithms proposed by Felzenszwalb. The first using only global memory (GPU_BP_GM), and the second using shared memory (GPU_BP_SM) of the graphic card to calculate the distance transformations. Results are going to be reported in comparison with TRW-S, a convergent tree-reweighted message passing algorithm, alpha-expansion, as well as the two other CUDA implementations.

The lower bound of the energy as provided by TRW-S is used as the baseline with respect to which the rest of the results are given as in the original paper. The GPU implementations run on a 256 core coprocessor of device capability 2.0 with an 89.6 GB/s device memory bandwidth and the CPU versions on a quad-core Intel Xeon W3530 working at 2.8 Ghz.

The main aim of the validation is to show the merits of the proposed algorithm in two domains: speed and optimization quality. More specifically, the present algorithm provides a very competitive solution within a very small time interval.

Figure 6:
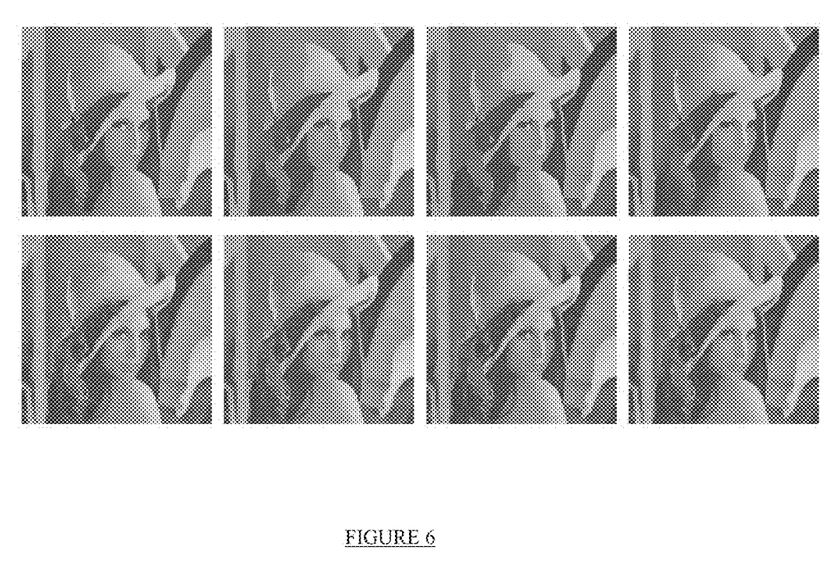
FIG. 6 depicts several pictures illustrating a comparison of t-student and quadratic potential function modelling.

The main interest of the proposed framework is that it can be applied to general pairwise functions and thus is not limited to the case of the linear or quadratic case. The first experiment is specifically designed to underline the interest of such an advantage. On FIG. 6, the Lena image has been corrupted with noise and two different pairwise models have been used in order to restore the image, the quadratic one and the t-student one. As it can be noted in FIG. 6, the more sophisticated pairwise potential is able to provide better results, to preserve more faithfully image details and eventually higher PSNR ratios. On the contrary, the quadratic pairwise constraint tends to over-smooth the image. FIG. 6 illustrates a comparison of t-student and quadratic potential function modeling. First row: quadratic potentials $\lambda$=25, truncation=200. Second row: t-student potentials $\alpha$=700, $\sigma$=7. First column: Cuda BP (PSNR: 25.28/27.5). Second column: Expansion (PSNR: 24.84/27.28). Third column: Fast-PD (PSNR: 24.27/26.26). Fourth column: TRWS (PSNR: 24.99/27.19).

The method according to the invention may be applied in different technical domain other than image processing.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
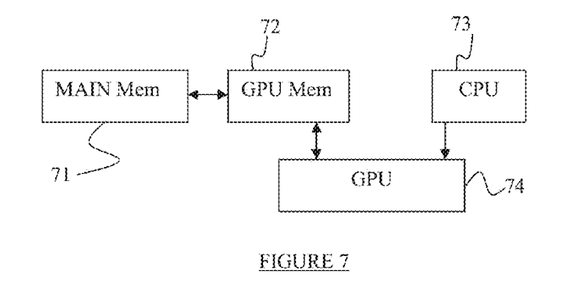
FIG. 7 depicts a schematic view of a CUDA.

FIG. 7 depicts a schematic view of the CUDA architecture which has been used in order to exploit the proposed parallel framework. The main memory 71 is intended to copy processing data to the GPU memory 72. Instructions for processing are delivered by the CPU 73 towards the GPU 74 which executes them in parallel in each core.

In general, the CUDA API describes a way to exploit a SIMD coprocessor. Programming takes place in the thread level. Threads are executed concurrently in blocks within which they share memory in order to communicate. The sum of all blocks forms a graph of threads that executes a common set of instructions called kernel. A high level view of the kernel used for the data cost and the optimization follows.

Figure 8:
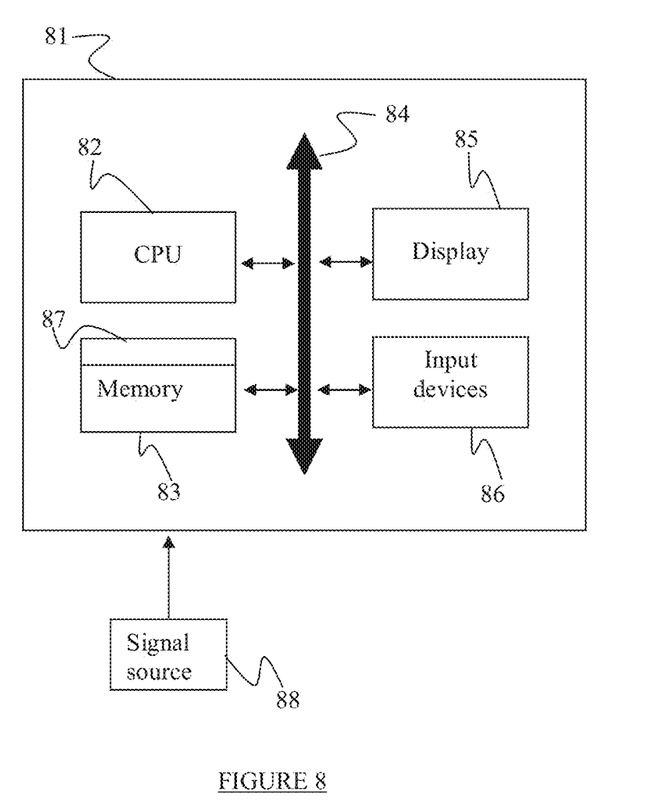
FIG. 8 is a bloc diagram of an exemplary computer system for implementing a registration method according to the present invention.

FIG. 8 is a block diagram of an exemplary computer system for efficiently performing a message passing algorithm. Referring now to FIG. 8, a computer system 81 for implementing the present invention can comprise, inter alia, a central processing unit (CPU) 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present invention can be implemented as a routine 87 that is stored in memory 83 and executed by the CPU 82 to process the signal from the signal source 88. As such, the computer system 81 is a general purpose computer system that becomes a specific purpose computer system when executing the routine 87 of the present invention. The computer system 81 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

Numerous variations and modifications will become apparent to those skilled in the art once the above disclosure is fully appreciated. It is intended that the following claims be interpreted to embrace all such variations and modifications.

The invention claimed is:

1. A method to be carried out by a processing device for efficiently performing a message passing algorithm encoded in software executable by said processing device and stored in a memory of said computer device, the method causing the processing device to preform steps comprising:
for each node i in the message passing algorithm, iteratively:
for each node j linked to node i:
combine incoming messages to form an intermediate vector I,
determining an output message vector M by:
considering an auxiliary seed vector S; a pairwise function r=d(x,y), where r, x, y are real numbers; and an index distance $\Delta \geq 2^{\wedge}$floor(log 2(N)), N being the length of message vector M and the seed vector S,
initializing S as S(m)=m for each element m of vector S,
for each index p of the vector I and while $\Delta$>0, computing in parallel, by:
considering the set of all indices within distance $\Delta$ from given index p, augmented by index p, for every index k belonging to this set, computing its distance from p using the function: d(p,k)+I(S(k)) in order to determine the minimum distance,
computing S(p)=S(n), n being the index corresponding to this minimum distance, and
computing $\Delta$=floor($\Delta$/2),
determining the message vector M by computing M(m) =I(S(m))+d(m,S(m)) for each element m of vector M,
communicating the vector M to node i.

2. The computer-implemented method according to claim 1, wherein during the step of combining incoming messages, all incoming messages are combined except the one coming from j.

3. The computer-implemented method according to claim 1, wherein after the step of determining an output message vector M, a normalization of messages is made.

4. A device comprising a non-transitory computer-readable storage medium encoded with computer-executable instructions which, when executed, efficiently perform a message passing algorithm comprising:
using a computer to perform the following:
for each node i in a message passing algorithm, iteratively:
for each node j linked to node i:

combine incoming messages to form an intermediate vector I, determining an output message vector M by:

considering an auxiliary seed vector S, a pairwise function r=d(x,y), where r,x,y are real numbers, and an index distance $\Delta \geq 2^{\wedge} \text{floor}(\log 2(N))$, N being the length of message vector M and the seed vector S, initializing S as S(m)=m for each element m of vector S, for each index p of the vector I and while $\Delta$>0, computing in parallel, by:

considering the set of all indices within distance $\Delta$ from given index p, augmented by index p, for every index k belonging to this set, computing its distance from p using the function: d(p,k)+I(S(k)) in order to determine the minimum distance, computing S(p)=S(n), n being the index corresponding to this minimum distance, and computing $\Delta=\text{floor}(\Delta/2)$, determining the message vector M by computing M(m)=I(S(m))+d(m,S(m)) for each element m of vector M, communicating the vector M to node i.

5. The device according to claim 4, wherein during the step of combining incoming messages, all incoming messages are combined except the one coming from j.

6. The device according to claim 4, wherein after the step of determining an output message vector M, a normalization of messages is made.

7. The device according to claim 4, wherein the method is implemented in a CUDA(Compute Unified Device Architecture) used to exploit a set of SIMD (Single Instruction Multiple Data) coprocessors.

8. The device according to claim 7, wherein instructions are programmed in the thread level, threads being executed concurrently in blocks within which they share memory in order to communicate, the sum of all blocks forming a grid of threads that executes a common set of instructions called kernel.

9. The computer-implemented method according to claim 2, wherein after the step of determining an output message vector M, a normalization of messages is made.

10. The device according to claim 5, wherein after the step of determining an output message vector M, a normalization of messages is made.

11. The device according to claim 5, wherein the method is implemented in a CUDA (Compute Unified Device Architecture) used to exploit a set of SIMD (Single Instruction Multiple Data) coprocessors.

12. The device according to claim 6, wherein the method is implemented in a CUDA (Compute Unified Device Architecture) used to exploit a set of SIMD (Single Instruction Multiple Data) coprocessors.

* * * * *